United States Patent [19]  [11]  4,343,660
Martin  [45]  Aug. 10, 1982

[54] CORROSION INHIBITING SYSTEM
[75] Inventor: Richard L. Martin, St. Louis, Mo.
[73] Assignee: Petrolite Corporation, St. Louis, Mo.
[21] Appl. No.: 894,292
[22] Filed: Apr. 7, 1978
[51] Int. Cl.$^3$ ............................................... C23F 7/00
[52] U.S. Cl. ............................. 148/6.14 R; 148/6.24;
427/117; 204/147; 106/14.16; 106/14.29;
106/14.42
[58] Field of Search ............... 427/154, 156, 435, 436,
427/437, 117; 204/147, 195, 196; 422/7–19;
106/14.16, 14.29, 14.42; 252/33, 391; 148/6.24,
6.14 R

[56]  References Cited
U.S. PATENT DOCUMENTS

| | | | |
|---|---|---|---|
| 3,342,637 | 9/1967 | Jaffe | 427/117 |
| 3,413,227 | 11/1968 | Howard et al. | 106/14.16 X |
| 3,668,137 | 6/1972 | Gardner | 252/391 X |
| 3,755,610 | 8/1973 | McTigue | 427/117 |
| 3,966,623 | 6/1976 | Krug et al. | 252/391 X |

Primary Examiner—Ralph S. Kendall
Attorney, Agent, or Firm—Sidney B. Ring; Hyman F. Glass

[57]  ABSTRACT

This invention relates to the process of inhibiting corrosion, and to compositions employed therein, which comprises coating copper with a barrier corrosion inhibitor, such as a water insoluble sulfonate, for example a petroleum or similar sulfonate as illustrated by a metal petroleum sulfonate, which contains an agent capable of complexing with copper, such as an organic sulfur, nitrogen, or sulfur-nitrogen compound for example an organic triazole, thiazole or the like. This process is particularly effective in inhibiting the corrosion of copper buried in the earth such as occurs when copper is exposed to electrochemical forces such as when copper is employed as neutral wires wrapped around the outside of an insulated power conducting cable and buried in the earth.

8 Claims, No Drawings

CORROSION INHIBITING SYSTEM

In the majority of past applications, copper or copper coated with certain other metals could be buried in the earth and suffer no corrosion damage to shorten its design life. Even in electrical distribution where alternating currents were involved, corrosion of buried copper was not a problem, especially if the copper was coated with tin or tin/lead alloys which corrode away leaving a protective corrosion product on the copper.

However, in recent years, increased utilization has been made of underground distribution lines, and frequently this means more buried copper. Copper is commonly used for the concentric neutral wires wrapped on the outside of insulated power-conducting cables. These concentric neutral wires serve two purposes; they serve as a return path for any current that leaks through the insulation of the power cable and also serve as a safety ground in case metal digging equipment would accidentally cut through the cable. The concentric neutral wires are loosely spiral wound around the insulation exterior and frequently the entire assembly is placed in loose fitting tubes before burial. A plating of tin or tin/lead alloy is commonly on the surface of the copper wires.

Although the mechanism is not yet clear, corrosion of these copper neutral wires has indeed been a problem with open circuits developing in some wires in less than three years. This has recently become a widely recognized problem with symposia at National Association of Corrosion Engineers conferences and with a number of papers being published which document the phenomenon. Corrosion seems to occur where electrolytes seep into the concentric neutral environment, and apparently, due to electrochemical forces, combine with a component of the leakage current to accelerate the corrosion of the copper. Thus although the buried copper may corrode at the rate of usually less than 1 mpy, never more than 10 mpy, concentric neutral wires wound around the insulated exterior have been found to corrode at the rate of as much as 50–150 mpy.

At present there are no solutions to the problem. Cathodic protection, often applied to buried metals, cannot successfully be applied for a number of reasons, mainly because of the commonly used outer tube. No corrosion inhibitors of protective coatings have yet proven successful.

A typical transmission cable has the following components:
(1) An inner conducting cable which is usually aluminum or copper wire,
(2) Covered with extruded plastic insulation,
(3) Spirally wound wires of copper or tinned copper, which are the concentric neutral wires. These are employed as a
  (a) grounding device
  (b) protective device if dug into,
(4) An optical super cover of a loose fitting plastic sheath.

I have now discovered a process of inhibiting corrosion which comprises coating copper with a barrier corrosion inhibitor such as a water insoluble sulfonate, for example a petroleum or similar sulfonate, as illustrated by a metal petroleum sulfonate, which contains an agent capable of complexing with copper, such as an organic sulfur, nitrogen or sulfur-nitrogen compound, for example an organic triazole, thiazole or the like.

This process is particularly effective in inhibiting the corrosion such as where copper is buried in the earth, and is particularly effective in inhibiting the corrosion of copper employed as neutral wires wrapped around the outside of insulated power conducting cables where copper is subjected to electrochemical forces so as to cause anodic polarization.

The following patents relate to other systems which employ components of this system for other uses.

U.S. Pat. No. 3,228,884, Louis G. Daignault, Fred W. Moore, and Melvin E. Gililland, assigned to Texaco, Inc., which claims methods for producing antifreeze compositions containing an alcohol plus tetraborate, alkaline earth metal oxide, boric acid, alkali metal mercaptobenzothiazole, alkali metal hydroxide, alkali metal arsenite and a petroleum lube oil solution of $CO_2$ neutralized basic alkaline earth metal alkylbenzene sulfonate.

U.S. Pat. No. 3,264,218, Louis G. Daignault and Michael P. Antalek, assigned to Texaco, Inc., which claims storage stabilized antifreeze compositions with the components of U.S. Pat. No. 3,228,884 with $CO_2$ neutralized basic alkaline earth metal hydrocarbon sulfonate as the sulfonate and an alkanolamine additive.

U.S. Pat. No. 3,625,894, Gunter Koenig and Helmut Landau, assigned to Parbwerke Hoechst Akienagesellschaft, which claims a lubricating composition consisting of mineral oil, an extreme pressure additive of chlorinated paraffin, and synergistic anticorrosion proportions of barium petroleum sulfonate and benzotriazole.

U.S. Pat. No. 3,147,223, David B. Boies, John L. Gerlach, Louis C. Larsonneur, and Jacob L. Bregman, assigned to Nalco Chemical Company, which claims aqueous antifreeze cooling solutions and methods of inhibiting corrosion in cooling systems of internal combustion engines by compositions containing alcohols, or glycols, an oil soluble petroleum sulfonate, mercaptobenzothiazole, a dispersant, and a mineral oil.

Suitable complexing agents include any sulfur, nitrogen or sulfur-nitrogen compound capable of complexing with copper so as to prevent the corrosion thereof. Suitable agents include those in the thiazole family, i.e. those containing the following structural moiety

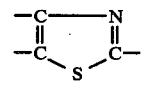

for example benzothiazole and derivatives thereof, for example of the formula

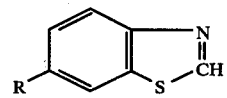

where R is hydrogen or substituted group such as alkyl, aryl, aralkyl, alkaryl, cycloalkyl, etc., such as alkyl substituted benzothiazole such as methyl, ethyl, butyl, tert-octyl, sec-hexyl, trimethyl, etc. benzothiazoles.

Other suitable thiazole complexing agents include 2-mercaptobenzothiazole and derivatives thereof having the following formula:

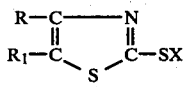

wherein X is selected from hydrogen, hydroxymethyl and metals from Groups I-A, I-B, II-A or II-B of the periodic table; R is selected from hydrogen and an alkyl group having from 1 to 10 carbon atoms; $R_1$ is selected from hydrogen and an alkyl group having from 1 to 10 carbon atoms, carboxy,

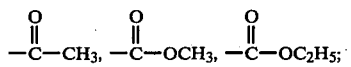

2-mercaptobenzothiazole and derivatives having the following formula:

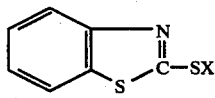

wherein X has the same meaning as above; substituted 2-mercaptothiazole compounds, such as:
5-chloro-2-mercaptobenzothiazole,
5-bromo-2-mercaptobenzothiazole,
5-sulfonic acid (sodium salt)-2-mercaptobenzothiazole,
5-amido-2-mercaptobenzothiazole,
5-methyl-2-mercaptobenzothiazole,
7-methyl-2-mercaptobenzothiazole,
5-carboxylic acid-2-mercaptobenzothiazole,
5-ethoxy-2-mercaptobenzothiazole,
6-ethoxy-2-mercaptobenzothiazole,
6-chloro-2-mercaptobenzothiazole, etc.;
2,2'-dithiobis(thiazole) and derivatives thereof having the following formula:

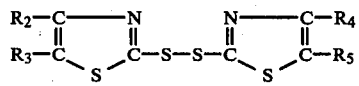

wherein $R_2$, $R_3$, $R_4$ and $R_5$ are selected from hydrogen and an alkyl group having from 1 to 10 carbon atoms; 2,2'-dithiobis(benzothiazole) and derivatives thereof such as 5,5'-dichloro-2,2'-dithiobis(benzothiazole), 5,5'-dibromo-2,2'-dithiobis(benzothiazole), 5,5'-disulfonic acid (sodium salt)-2,2'-dithiobix(benzothiazole), 5,5'-diamido-2,2'-dithiobis(benzothiazole), 5,5'-dimethyl-2,2'-dithiobis(benzothiazole), 7,7'-dimethyl-2,2'-dithiobis(benzothiazole) 5,5'-dicarboxylic acid-2,2'-dithiobis(benzothiazole), 5,5'-diethoxy-2,2'-dithiobis(benzothiazole), 6,6-diethoxy-2,2'0dithiobis(benzothiazole), etc; polysulfides of the 2-mercaptobenzothiazole compounds listed above; 2-mercaptonapthothiazole; 2,2'-dithiobis(naphthothiazole) and polysulfides of 2-mercaptonaphthothiazole and derivatives of these compounds analogous to the 2-mercaptobenzothiazole derivatives listed above.

Typical organic nitrogen complexing agents are benzotriazole and related compounds which conform to the general formula:

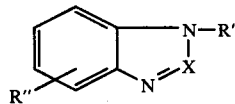

wherein X can be nitrogen, aminomethylidyne ($\equiv CNH_2$), methylidyne ($\equiv CN$), benzylidyne ($\equiv CC_6H_5$), or guanidinomethylidyne

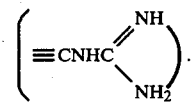

R' can be hydrogen or an alkyl group, or an alkali metal when X is nitrogen, and R" can be hydrogen or a lower alkyl group. Common names of some of these compounds are benzotriazole, sodium benzotriazole, potassium benzotriazole, methyl benzotriazole, benzimidazole, guanidino benzimidazole, 2-phenyl benzimidazole, tolyltriazole, sodium tolytriazole, and the like.

Any suitable barrier corrosion inhibitor can be employed, i.e. a corrosion inhibitor which because of its water insolubility protects the metal by its physical presence from water intrusion. Representative examples of suitable barrier corrosion inhibitors are water insoluble organic sulfonates such as petroleum sulfonates or their equivalent.

Oil-soluble petroleum sulfonates are soaps of oil-soluble petroleum sulfonic acids commonly known as mahogany acids. They are produced by a controlled reaction between sulfuric acid and petroleum distillates. The oil-soluble or olefinic sulfonic acids in the upper oil layer are converted to salts by neutralization, preferably with an alkali metal or ammonium hydroxide. The sulfonates are removed from the oil by suitable extraction media, then they are concentrated and further purified. In general, petroleum sulfonates which have molecular weights above 400 are classified as oil-soluble, while those with molecular weights below 400 are water-soluble or hydrophilic petroleum sulfonates. The oil-soluble sulfonates may be dispersible in water but are not water-soluble. Methods for the production of the oil-soluble petroleum sulfonates are well known and are described in the literature. U.S. Pat. No. 2,412,633, for example, contains a description of their production, as well as various soaps or salts of the petroleum sulfonic acids which are contemplated, including the alkali and alkaline earth metal salts and ammonium or amine salts.

Preferred salts are Ca, Ba, Mg, etc. salts.

Other organic sulfonates are alkyl benzene sulfonates for example benzene alkylated with butylene dimer, trimer, etc. such as described in U.S. Pat. No. 2,746,980.

I have discovered that the corrosion mechanism involves acceleration of the anodic polarization of the copper, probably due to leakage currents. Soluble salts that leach into the electrolyte make the problem worse but anodic polarization is the prime cause of corrosion. Therefore, the testing emphasized the importance of inhibiting anodic polarization as indicated by potentiodynamic polarization curves.

In general, tests were conducted by dipping the copper coupons in inhibitor solution, dripping dry in quiescent laboratory air, then corrosion testing in an air saturated water solution of 5% NaCl at room temperature.

Both pure copper and copper coated with tin/lead were tested. A "PETROLITE® CORROSION RATE INSTRUMENT" (also called "PAIR" Meter) was used to follow open circuit corrosion rates while a "PETROLITE POTENTIODYNE® ANALYZER" was used for anodic polarization.

The preferred inhibitor is a combination of benzotriazole and calcium overbased petroleum sulfonate. Since the two components are not miscible in each other, a mutual solvent or suspendant is necessary. Alcohols, glycols and surfactants are all satisfactory; the final choice can depend on the method of application. As long as the solvent gives a homogenous solution or suspension at the time of application and will deposit the two inhibitor components on the copper or coated copper, good results are obtained.

Although I do not want to be bound by theoretical consideration, I believe that the two components are much better than either alone in that they function in different ways. The petroleum sulfonate is a barrier-type inhibitor, minimizing direct contact between metal and electrolyte. At holidays, rubbed areas, or other imperfections in this barrier, benzotriazole leached from the film into the intruding electrolyte forms a copper-benzotriazole complex which hinders anodic activity (corrosion).

The corrosion inhibitor is applied by any suitable means such as by painting, dipping, spraying, etc. If already buried the metal can be treated by pumping the mixture into the spaces surrounding the metal.

The following formulations were employed in the tests described in Table I. The ratios expressed therein are weight ratios.

TABLE I

| Ex. | |
|---|---|
| 1 | 50/50 Calcium Petroleum Sulfonate/Oxyalkylated Alfol 8–10 |
| 2 | 2/98 Benzotriazole/Oxyalkylated Alfol 8–10 |
| 3 | 18/80/2 Calcium Petroleum Sulfonate/Isopropanol/Benzotriazole |
| 4 | 18/80/2 Calcium Petroleum Sulfonate/Oxyalkylated Alfol 8–10/Benzotriazole |
| 5 | 49/49/2 Calcium Petroleum Sulfonate/Oxyalkylated Alfol 8–10/Benzotriazole |

The Calcium Petroleum Sulfonate is water insoluble and 60% active in mineral oil. It has a base number of 160, Brookfield viscosity is 45,000 cps at 77° with a molecular weight of about 1000.

The oxyalkylated Alfol 8-10 is a straight chained Alkanol oxyethylated with b 3.3 Mole of EtO/M (or 1/1 by weight) alkanol and it is employed as a solvent/dispersant.

The preferred sulfonate is an overbased sulfonate. By overbased I mean an excess of metal base component reacted with the acidic sulfonate. The overbasing employed is from about 20/1 to 1.5/1 such as from about 10/1 to 2/1, but preferably from about 8/1 to 3/1.

The following examples are presented for purposes of illustration and not of limitation.

TABLE II

| | Copper Blank | Coated Copper Blank | Copper Treated with ex.1 | Copper Treated with ex.2 | Copper Treated with ex.3 | Copper Treated with ex.4 | Copper Treated with ex.5 | Coated Copper Treated with ex.3 |
|---|---|---|---|---|---|---|---|---|
| MPY @ 1 Hour | 11 | 7 | 4.0 | 3.3 | .1 | 0.1 | 0.1 | 0.2 |
| MPY @ 4 Days | 15 | | 0.7 | 1.5 | .1 | 0.1 | .1 | |
| MPY @ 50 mv Anodic Polarization* After four Days | 75 | 110 | 1.5 | 3.3 | .1 | 0.2 | .1 | 0.3 |

*Anodic polarization of 50 mv was chosen because, at this point, blank corrosion rates approximate those seen in the field.

From Table II it is evident that:

1. Copper is more protected by Ca overbased petroleum sulfonate plus benzotriazole than the additive effect of either alone;
2. Protection is also afforded to tin/lead plated copper;
3. The percent protection is increased at anodic polarizations of the copper;
4. Several solvent systems and ratios work well; the optimum concentration depends on the particular solvent system.

In general, there should be sufficient barrier corrosion inhibitor to coat the metal and sufficient complexing agent in the barrier corrosion inhibitor to chelate with copper where corrosive fluids penetrate this barrier by any means such as by holidays (i.e., pinpoint entrance points) in the barrier corrosion inhibitor.

The weight ratio of barrier corrosion inhibitor to copper complexing agent may vary widely depending on the particular system, the particular copper complexing agent, etc. In general, the ratio of barrier corrosion inhibitor to copper complexing agents is from about 100/1 to 1/100, such as from about 90/1 to 1/2, for example from about 50/1 to 1/1, but preferably from about 25/1 to 5/1.

The amount of total corrosion inhibitor employed should be sufficient to coat copper to a thickness so as to protect it from the effects of corrosive materials. For example, a thickness of from about 0.0001" to 0.100", such as from about 0.001" to 0.050", for example from about 0.002" to 0.25", but preferably from about 0.005" to 0.015".

I claim:

1. A process of inhibiting copper corrosion of buried copper transmission cable which comprises treating the copper with a composition containing a barrier corrosion inhibitor and a copper complexing agent, where the barrier corrosion inhibitor is a substantially water-insoluble organic sulfonate and the copper complexing agent is a sulfur, nitrogen, or sulfur-nitrogen compound capable of complexing with copper, said barrier corrosion inhibitor being present in an amount sufficient to coat the copper to a thickness of from about 0.0001" to 0.100" and the weight ratio of barrier corrosion inhibitor to copper complexing agent is from about 100:1 to 1:100.

2. The process of claim 1 where the sulfonate is an overbased salt of an organic sulfonate and the copper complexing agent is an organic thiazole or triazine.

3. The process of claim 2 in which the overbased salt of an organic sulfonate is calcium sulfonate and the copper complexing agent is a benzothiazole, a mercaptobenzothiazole or a benzotriazine.

4. The process of claim 2 where copper is subjected to electrochemical forces so as to cause anodic polarization.

5. The process of claim 3 where the calcium sulfonate is calcium petroleum sulfonate and the copper complexing agent is benzothiazole.

6. The process of claim 3 where copper is subjected to electrochemical forces so as to cause anodic polarization.

7. The process of claim 5 where copper is subjected to electrochemical forces so as to cause anodic polarization.

8. The process of claim 1 where copper is subjected to electrochemical forces so as to cause anodic polarization.

* * * * *